United States Patent
Sholtis (10) Patent No.: US 11,615,180 B2
(45) Date of Patent: Mar. 28, 2023

(54) SYSTEM AND METHOD TO FACILITATE THE SECURITY FOR SETS OF CREDENTIALS

(71) Applicant: Steven Sholtis, Hampstead, NC (US)

(72) Inventor: Steven Sholtis, Hampstead, NC (US)

( * ) Notice: Subject to any disclaimer, the term of this patent is extended or adjusted under 35 U.S.C. 154(b) by 76 days.

(21) Appl. No.: 17/207,411

(22) Filed: Mar. 19, 2021

(65) Prior Publication Data

US 2021/0240814 A1 Aug. 5, 2021

Related U.S. Application Data

(60) Provisional application No. 62/991,990, filed on Mar. 19, 2020.

(51) Int. Cl.
| | |
|---|---|
| G06F 21/45 | (2013.01) |
| H04L 9/40 | (2022.01) |
| G06F 21/31 | (2013.01) |

(52) U.S. Cl.
CPC .............. *G06F 21/45* (2013.01); *G06F 21/31* (2013.01); *H04L 63/10* (2013.01); *G06F 2221/2115* (2013.01)

(58) Field of Classification Search
CPC ....... G06F 21/31; G06F 21/45; H04L 63/083; H04L 63/10
See application file for complete search history.

(56) References Cited

U.S. PATENT DOCUMENTS

| | | | | |
|---|---|---|---|---|
| 6,067,568 | A  * | 5/2000 | Li | H04L 41/00 709/223 |
| 7,797,734 | B2 * | 9/2010 | Babi | H04L 63/08 726/4 |
| 2007/0101411 | A1* | 5/2007 | Babi | H04L 63/18 726/4 |
| 2009/0019514 | A1* | 1/2009 | Hazlewood | H04L 63/0281 726/1 |
| 2020/0213334 | A1* | 7/2020 | Kutner | H04L 63/101 |
| 2021/0240814 | A1* | 8/2021 | Sholtis | H04L 63/10 |
| 2022/0172303 | A1* | 6/2022 | Handy Bosma | G06Q 50/01 |

FOREIGN PATENT DOCUMENTS

WO   WO2009007188 A1   1/2009

* cited by examiner

*Primary Examiner* — Dao Q Ho (57) ABSTRACT

A system and a method are provided for facilitating the security of sets of credentials. The system and method allow a user to lock or unlock a credential set of at least one user account. The user attempts to access the user account as standard procedure. Before a service provider goes through an authentication process, a third-party server of a service provider requests a token from the system. Based on if the credential set is in a locked status or unlocked status, at least one remote server of the system respectively relays an invalidation token or a validation token to the third-party server. If the invalidation token is relayed to the third-party server, the service provider does not go through the authentication process. If the validation token is relayed to the third-party server, the service provider proceeds with the authentication process as standard procedure.

12 Claims, 13 Drawing Sheets

SYSTEM AND METHOD TO FACILITATE THE SECURITY FOR SETS OF CREDENTIALS

The current application claims a priority to the U.S. Provisional Patent application Ser. No. 62/991,990 filed on Mar. 19, 2020.

FIELD OF THE INVENTION

The present invention relates generally to data processing. More specifically, the present invention is systems and methods to facilitate the security for sets of credentials.

BACKGROUND OF THE INVENTION

Username/Password credential validation methods are the most commonly used authentication methods on the Internet. Almost all online services, sites, applications, and processes rely on the validation of credentials prior to authorizing access to resources.

The services, applications and other interfaces rely on authentication prior to granting access; therefore, they listen for authentication requests waiting to validate them. This often leaves these systems open to receive requests for validations outside of the window of time the actual owner of the credentials intends to use them to authenticate.

Therefore, there is a need for improved systems and methods to facilitate the security for sets of credentials that may overcome one or more of the above-mentioned problems and/or limitations. The present invention provides a system and method for facilitating the security for sets of credentials. The present invention allows a user to lock or unlock sets of credentials. Before a service provider goes through an authentication process, the service provider requests a token from the service provided by the present invention. Based on if the credential set is in a locked or unlocked status, the present invention respectively relays an invalidation token or a validation token to the service provider. If the invalidation token is relayed to the service provider, the service provider does not go through the authentication process. If the validation token is relayed to the service provider, the service provider proceeds with the authentication process as standard procedure.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method for facilitating the security for sets of credentials is disclosed. Accordingly, the method may include a step of receiving, using a communication device, a login request associated with at least one user from a resource owner. Further, the method may include a step of analyzing, using a processing device, the login request. Further, the method may include a step of retrieving, using a storage device, a preauthorized token from the resource owner. Further, the method may include a step of validating, using the processing device, the credential set state associated with the at least one user. Further, the method may include a step of generating, using the processing device, a token response associated with the credential set state. Further, the method may include a step of transmitting, using the communication device, the token response to the resource owner.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

DETAIL DESCRIPTIONS OF THE INVENTION

All illustrations of the drawings are for the purpose of describing selected versions of the present invention and are not intended to limit the scope of the present invention.

Figure 1:
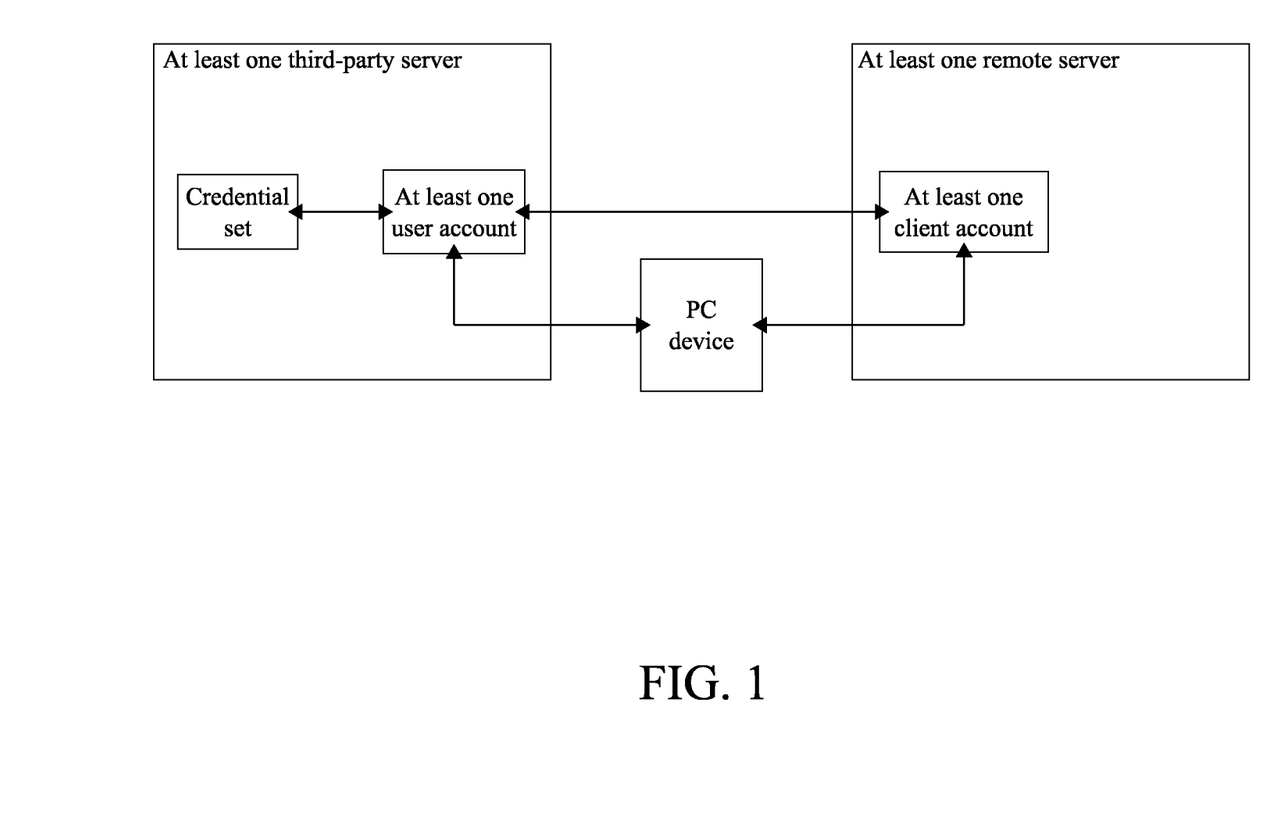
FIG. 1 is a block diagram for the system of the present invention.

In reference to FIGS. 1 through 13, the present invention provides a system and method for facilitating the security for sets of credentials. More specifically, the present invention allows a user to lock or unlock sets of credentials of user accounts for security measures. For example, if the user does not use a certain user account on a daily basis, the user can lock the credentials for the certain user account in order to prevent an unwanted party from hacking the certain user account. With reference to FIG. 1, the system of the present invention includes at least one remote server that manages at least one client account (Step A). The client account is associated with a corresponding personal computing (PC) device. The remote server is a computing node that processes and stores information provided by the client account. The PC device may be any type of computing device such as, but not limited to, a desktop computer, a notebook computer, a smartphone, or a mobile tablet. Additionally, the system of the present invention includes at least one third-party server that manages at least one user account (Step B). The user account is associated with the corresponding PC device, the user account includes a credential set, the user account is associated with the client account, and the credential set is either in an unlocked or a locked status. The third-party server is a computing node that processes and stores information provided by the user account. Moreover, the third-party server is a computing node that is associated with a third-party service such as, but not limited to, an email service, an electronic vehicle entry service, a building access service, a computer operating system, or an Internet of Things (IoT) network. The credential set allows the user to access the user account, and thus, use the service provided by the third-party server. In more detail, the credential set can be a username and password that the user must enter correctly in order to access the user account. Moreover, the credential set can be associated with a credential token that allows the user to quickly access the user account with biometric or facial information. Alternatively, the credential can be associated with a credential key. For example, the credential token can be any type of credential token such as, but not limited to, a facial identification token or a touch identification token. Furthermore, the unlocked status or the locked status can be toggled by the user or the user can grant the service provider of the third-party server the ability to toggle the credential set between the unlocked or locked status.

Figure 2:
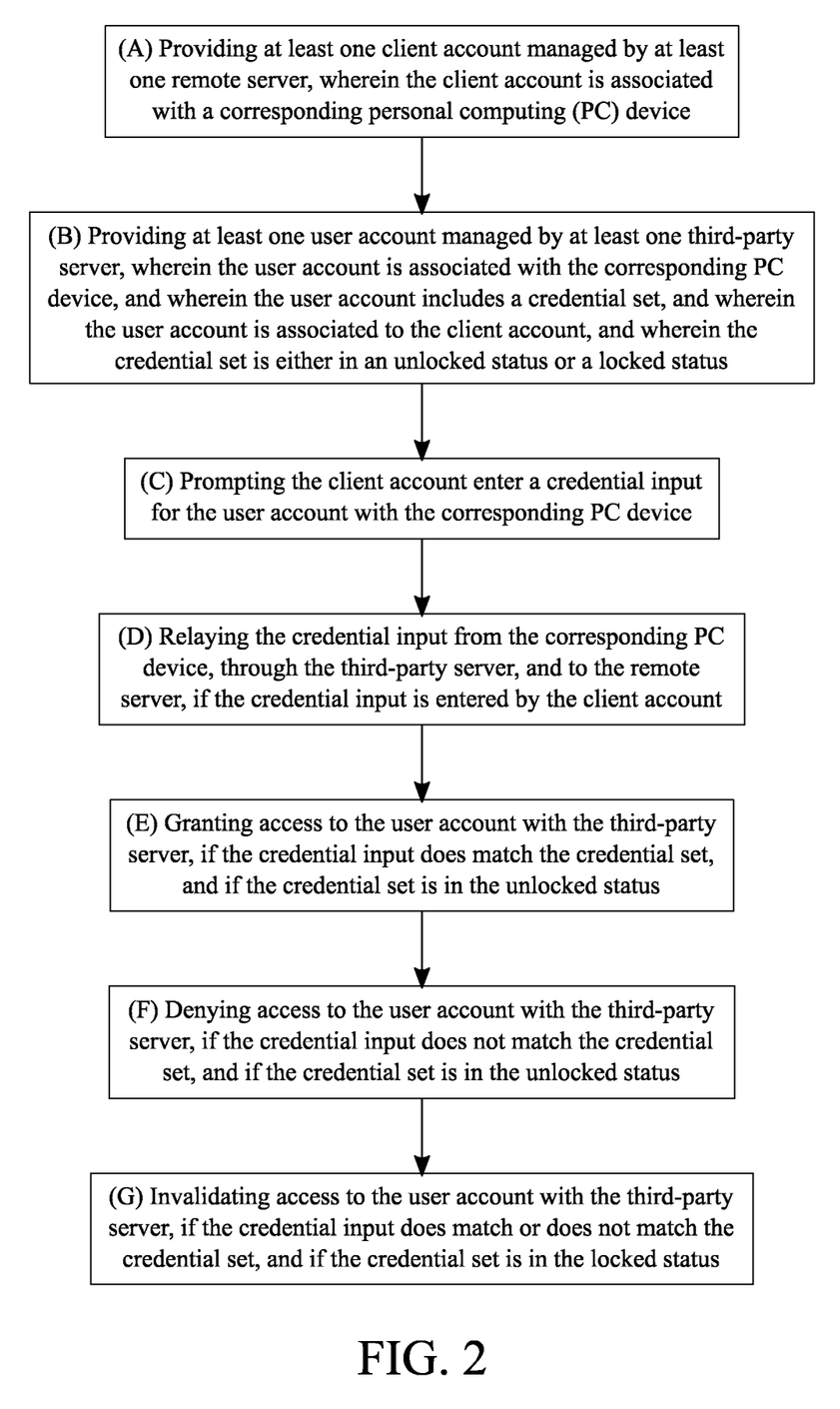
FIG. 2 is a flowchart illustrating the overall process for the method of the present invention.

With reference to FIG. 2, the method of the present invention follows an overall process for facilitating the security for sets of credentials. The corresponding PC device prompts the client account to enter a credential input for the user account (Step C). More specifically, the client account is prompted to enter a username and password or to use a facial or biometric data in order to access the service provided by the third-party server. The credential input is relayed from the corresponding PC device, through the third-party server, and to the remote server, if the credential input is entered by the client account (Step D). In further detail, the credent input is received by the third-party server for an authentication process. However, before the credential input is authenticated, the credential input is sent to the remote server in order to check if the credential set is in the unlocked or locked status. The third-party server grants access to the user account, if the credential input does match the credential set, and if the credential set is in the unlocked status (Step E). In further detail, the remote server validates the credential set because the credential set is in the unlocked status. Therefore, the third-party server can proceed with the authentication process. Further, the third-party server authenticates the credential input because it matches the credential set, and thus, the user can access the service provided by the third-party account. Alternatively, the third-party server denies access to the user account, if the credential input does not match the credential set, and if the credential set in in the unlocked status (Step F). Similar to Step E, the remote server validates the credential set because the credential set is in the unlocked status in order for the third-party server to proceed with the authentication process. The third-party server fails to authenticate the credential input because it does not match the credential set. For example, the password may have not been correct, or the facial or biometric data respectively did not match the credential token or key. The third-party server will follow standard authentication procedure by prompting to reenter the credential input or to go through an account recovery process. As another alternative result, the third-party server invalidates access to the user account, if the credential set does or does not match the credential set, and if the credential set is in the locked status (Step G). In further detail, the remote server invalidates the credential set because the credential set is in the locked status. This prevents the third-party server from proceeding with the authentication process. Instead of going through the authentication process, the third-party server invalidates access to the user account by providing an error message or error website page to the user. Thus, an unwanted user cannot attempt to hack the user account when the credential set is in the locked status.

Figure 3:
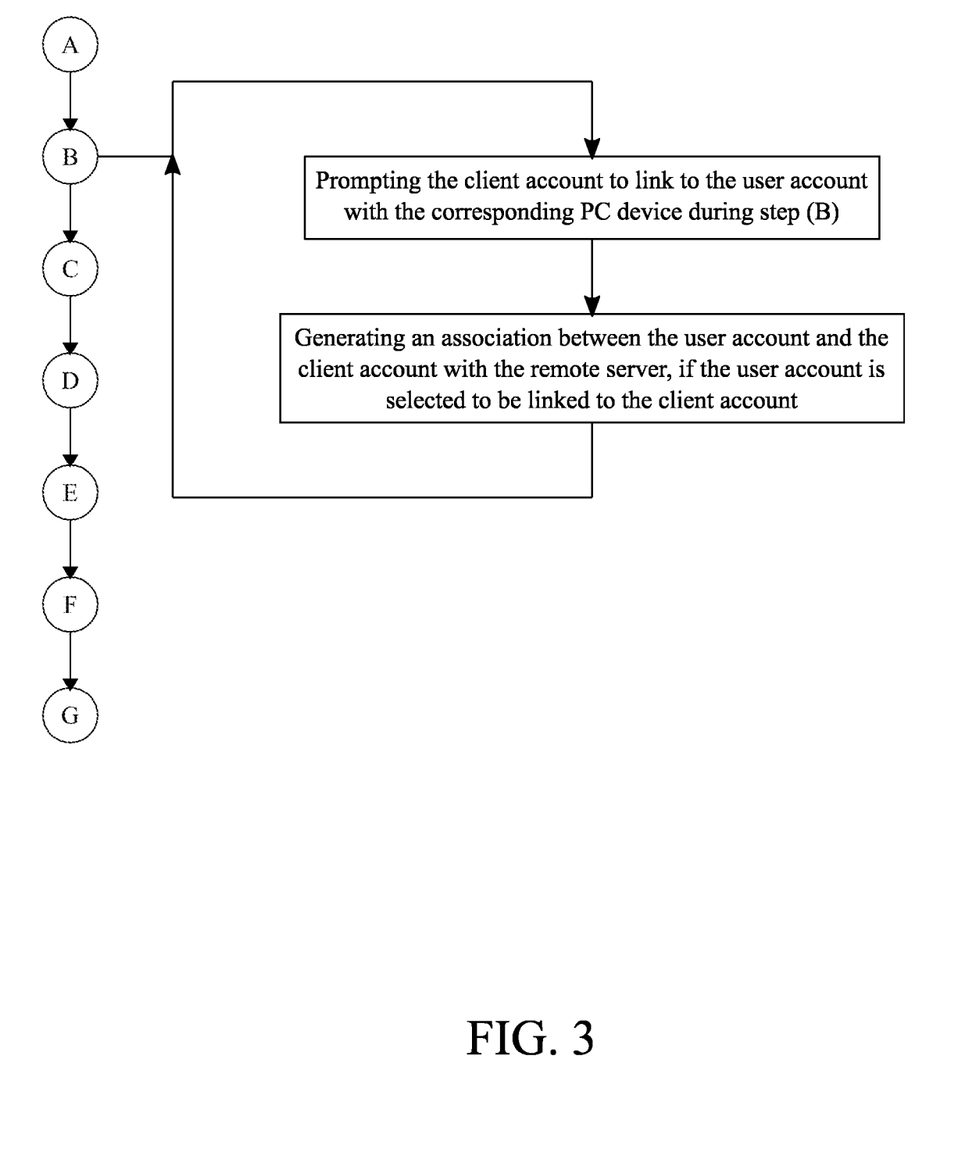
FIG. 3 is a flowchart illustrating the subprocess of linking a user account to the client account.

In order for the user to link the user account with the client account and with reference to FIG. 3, the following subprocess is executed. The corresponding PC device prompts the client account to link to the user account. In more detail, the user is prompted to link one or more user accounts from various third-party services. This can be executed in various conditions. For example, the user can be prompted to link an existing user account for a service to the client account or the user can be prompted to link a new user account for a service to the client account during the account creation process hosted by the third-party server. The remote server generates an association between the user account and the client account, if the user account is selected to be linked to the client account. The association between the user account and the client account allows the remote server to validate or invalidate the credential set depending on if the credential set is in the unlocked status or the locked status. Furthermore, the association between the user account and the client account provides the user the ability to unlock or lock the credential set.

Figure 4:
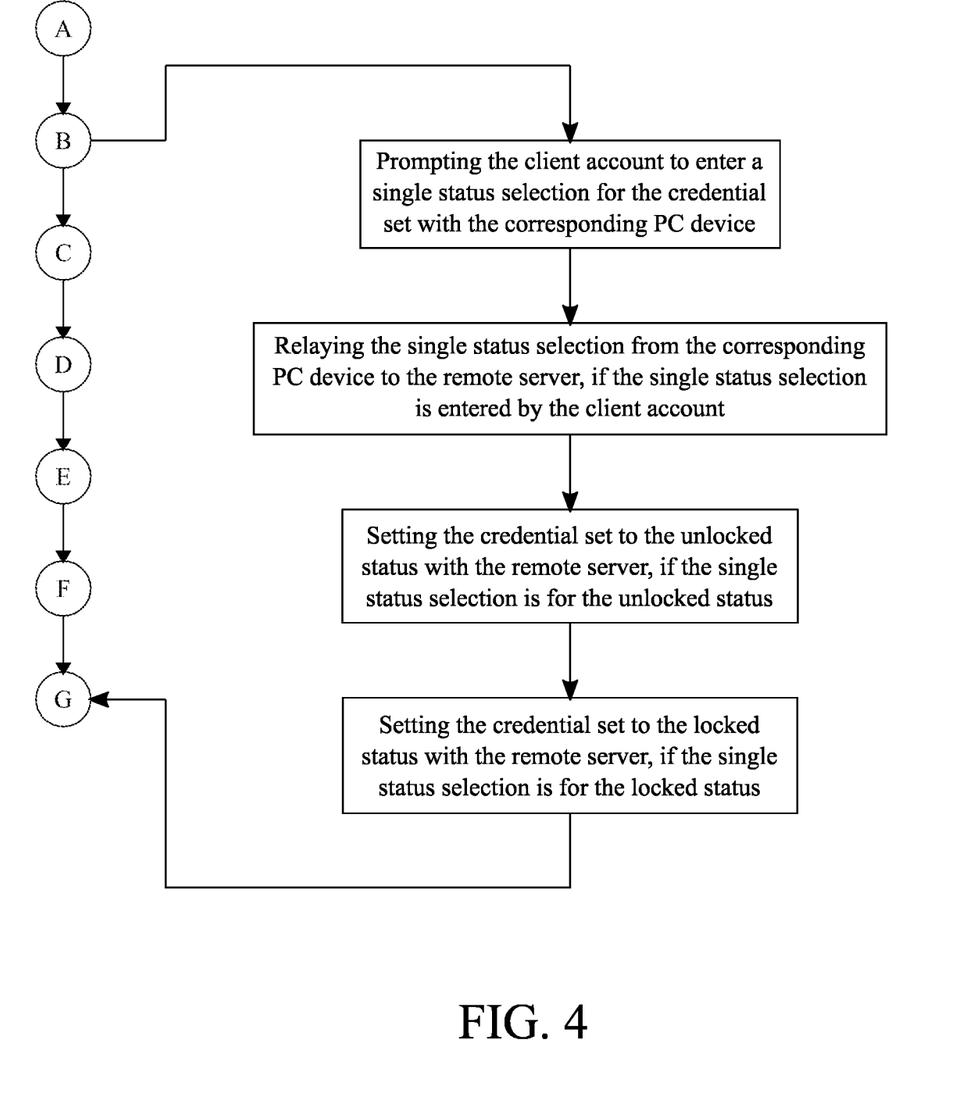
FIG. 4 is a flowchart illustrating the subprocess of toggling between the unlocked status or the locked status for the credential set.

In order for the user to toggle between the unlocked or locked status for the credential set and with reference to FIG. 4, the following subprocess is executed. The corresponding PC device prompts the client account to enter a single status selection for the credential set. In further detail, the single status selection is an input to toggle the credential set to either the unlocked status or the locked status. The single status selection is relayed from the corresponding PC device to the remote server, if the single status selection is entered by the client account. Thus, the remote server is instructed to toggle the status of the credential set based on the single status selection. The remote server sets the credential set to the unlocked status, if the single status selection is for the unlocked status. Thus, the user can toggle the credential set from the locked status to the unlocked status. Alternatively, the remote server sets the credential set to the locked status, if the single status selection is for the locked status. Thus, the user can toggle the credential set from the unlocked status to the locked status.

Figure 5:
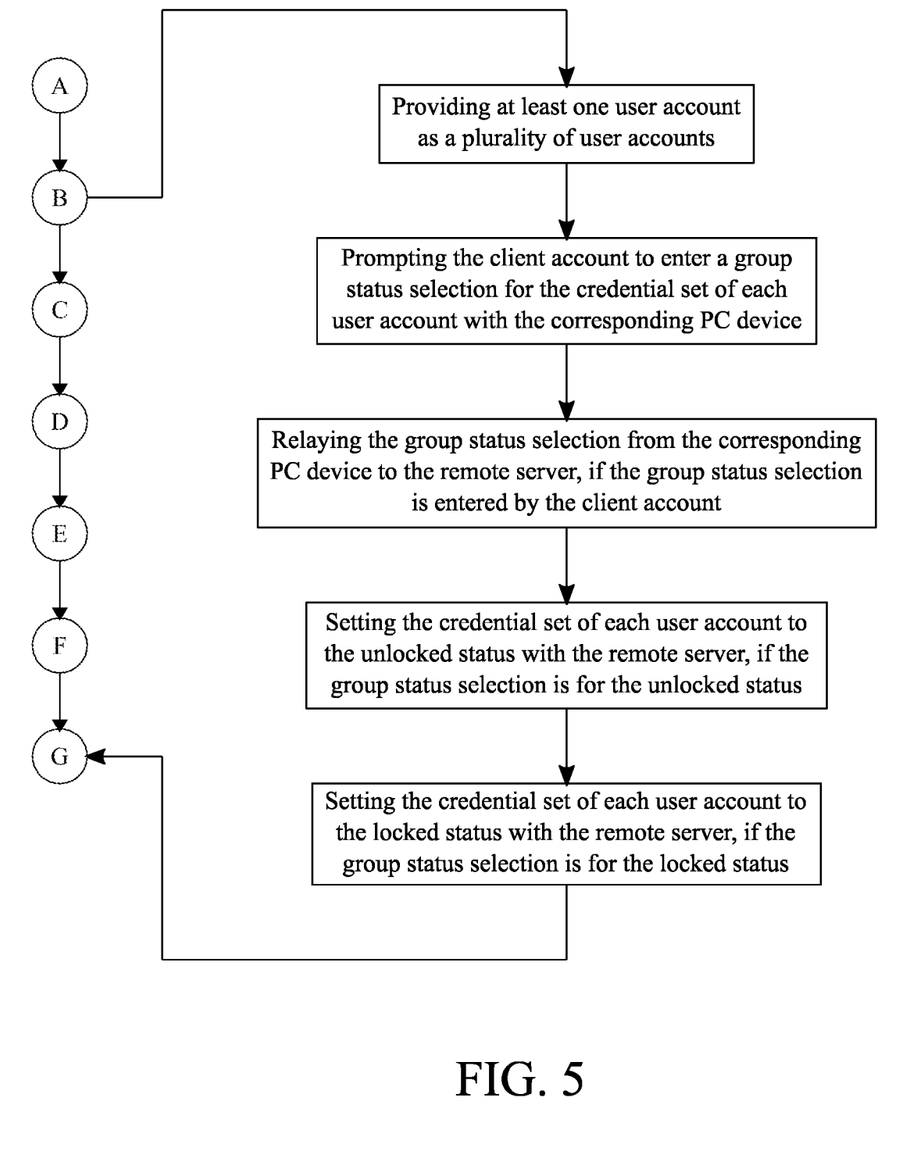
FIG. 5 is a flowchart illustrating the subprocess of toggling between the unlocked status or the locked status for at least two or all of the credential sets for a plurality of user accounts.
Figure 6:
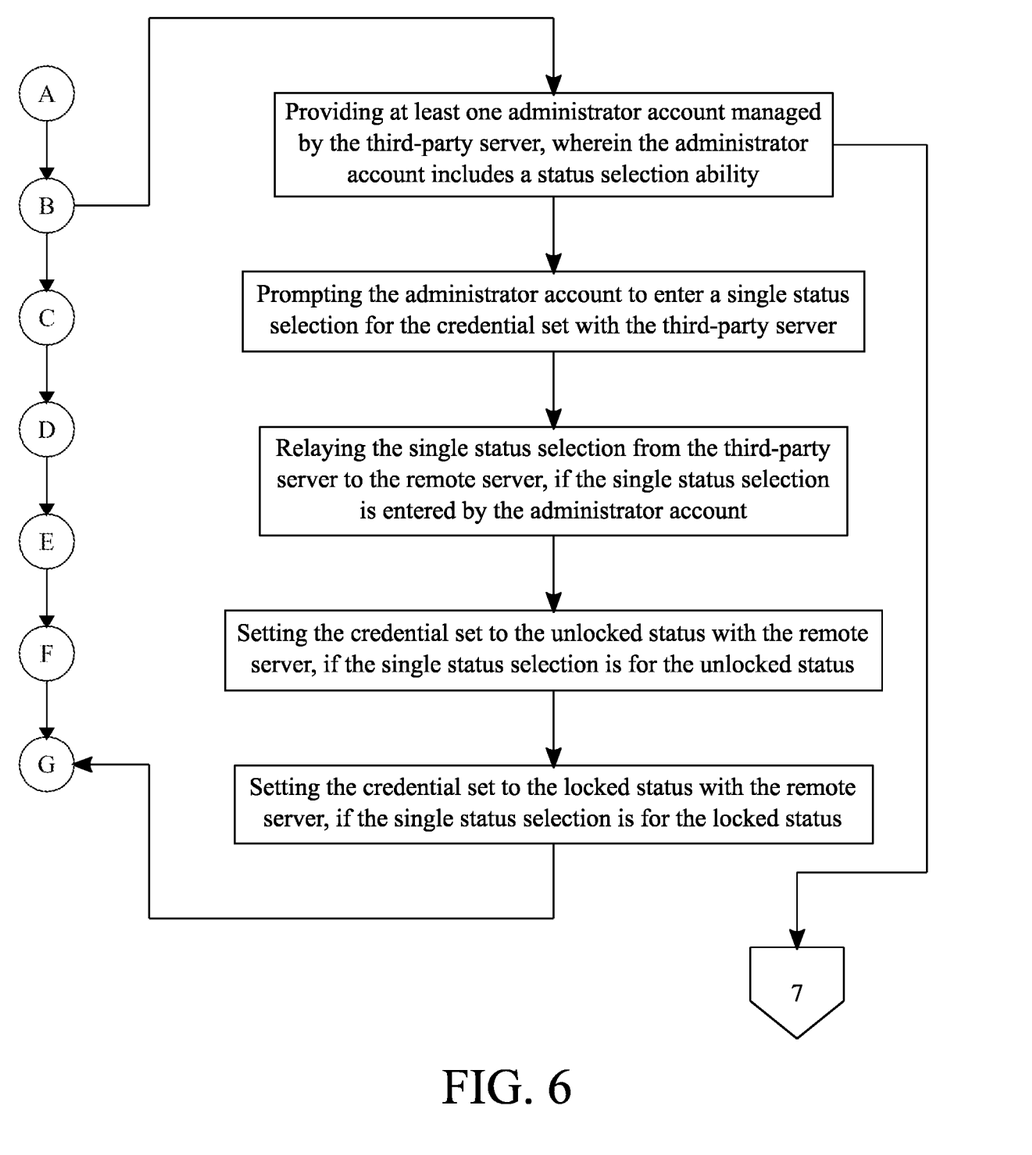
FIG. 6 is a flowchart illustrating the subprocess of an administrator account of the third-party server toggling between the unlocked status or the locked status for the credential set.

In order for the user to toggle between the unlocked status or the locked status for at least two or all of the credential sets for a plurality of user accounts and with reference to FIG. 5, the following subprocess is executed. The at least one user account is provided as a plurality of user accounts. The corresponding PC device prompts the client account to enter a group status selection for the credential set for each user account. In further detail, the group status selection is an input to toggle at least two or all of the credential sets for the plurality of user accounts to either the unlocked status or the locked status. The group status selection is relayed from the corresponding PC device to the remote server, if the group status selection is entered by the client account. Thus, the remote server is instructed to toggle the status of at least two or all of the credential sets based on the group status selection. The remote server sets the credential set of each user account to the unlocked status, if the group status selection is for the unlocked status. Thus, the user can toggle at least two or all of the credential sets for the plurality of user accounts from the locked status to the unlocked status. Alternatively, the remote server sets the credential set of each user account to the locked status, if the group status selection is for the locked status. Thus, the user can toggle at least two or all of the credential sets for the plurality of user accounts from the unlocked status to the locked status.

As mentioned previously and with reference to FIG. 6, the service provider of the third-party server can toggle between the unlocked status or the locked status for the credential set. This is executed through the following subprocess. The third-party server manages at least one administrator account that includes a status selection ability. The administrator account is the account used by the service provider in order manage the user account. The third-party server prompts the administrator account to enter a single status selection for the credential set. In further detail, the single status selection is an input to toggle the credential set to either the unlocked status or locked status. The single status selection is relayed from the third-party server to the remote server, if the single status selection is entered by the administrator account. Thus, the remote server is instructed to toggle the status of the credential set based on the single status selection. The remote server sets the credential set to the unlocked status, if the single status selection is for the unlocked status. In more detail, if the user cannot personally toggle the credential set from the unlocked status to the locked status, the service provider of the third-party server can toggle the credential set to the unlocked status in order for the user to access the user account. Thus, the service provider can toggle the credential set from the locked status to the unlocked status. Alternatively, the remote server sets the credential set to the locked status, if the single status selection is for the locked status. In more detail, the service provider can automatically toggle the credential set to the locked status if the service provider notices any suspicious activity. More specifically, the suspicious activity can be an unwanted user attempting to access the user account. Thus, the service provider can toggle the credential set from the unlocked status to the locked status.

Figure 7:
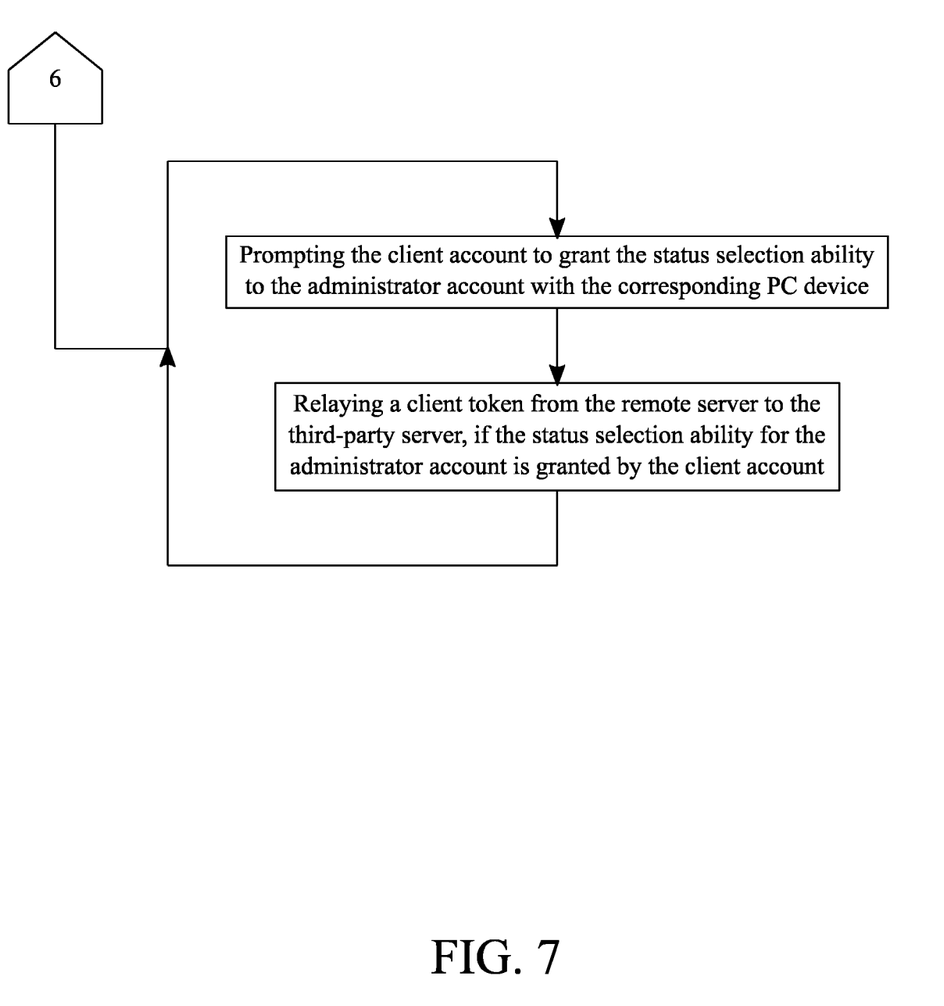
FIG. 7 is a flowchart illustrating the subprocess of the client account granting the status selection ability to the administrator account.

In order for the user to grant the status selection ability to the service provider and with reference to FIG. 7, the following subprocess is executed. The corresponding PC device prompts the client account to grant the status selection ability to the administrator account. This process is recommended when there is a high degree of trust between the user and the service provider. For example, the relationship between the service provider and the user is for a device operating system or a highly privileged application service. Additionally, this process is also recommended when other authorization grant types such as, but not limited to, authorization codes are not provided by the service provider. A client token is relayed from the remote server to the third-party server, if the status selection ability for the administrator account is granted by the client account. With the client token, the service provider obtains the status selection ability, and thus, the service provider can toggle the credential set between the unlocked status or the locked status.

Figure 8:
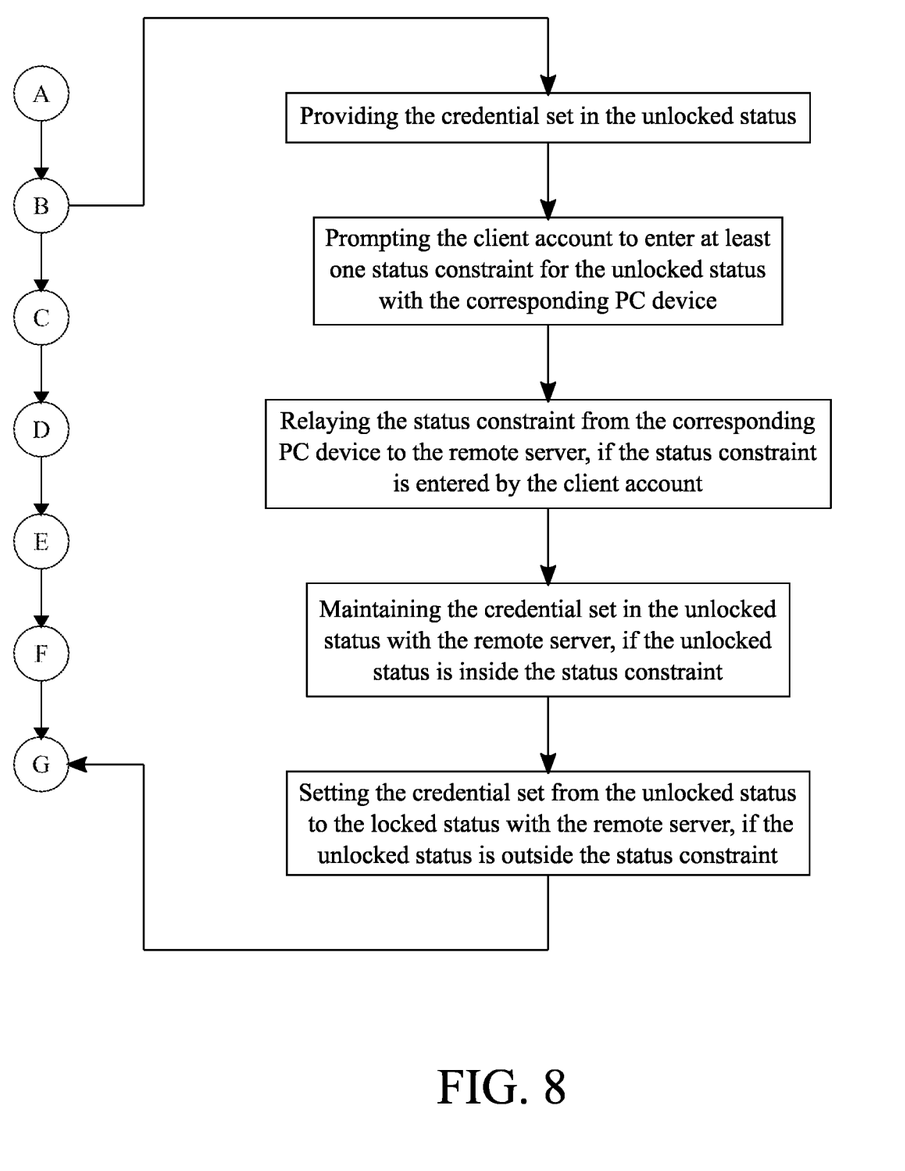
FIG. 8 is a flowchart illustrating the subprocess of applying a status constraint for the unlocked status of the credential set.

In order for the user to place a status constraint for the unlocked status of the credential set and with reference to FIG. 8, the following subprocess is executed. With the credential set already set to the unlocked status, the corresponding PC device prompts the client account to enter at least one status constraint for the unlocked status. The status constraint can be any type of constraint such as, but not limited to, a time-based constraint, a location-based constraint, or a subscription-based constraint. For example, if the status constraint is a time-based constraint, the user can set the credential set to be in the unlocked status for specified period of time. In another example, if the status constraint is a location-based constraint, the user can set the credential set to be in the unlocked status whenever the user is in a specified location. In further detail, a geofenced area may be generated, and the credential set would stay in the unlocked status or toggle to the unlocked status whenever the corresponding PC device is within or enters the generated geofenced area. This can be managed and monitored through a Global Navigation Satellite System (GNSS) device which may be provided with the corresponding PC device. Moreover, if the status constraint is a subscription-based constraint, the user can set the credential set to be in the unlocked status for as long as a subscription to a service is active. The status constraint is relayed from the corresponding PC device to the remote server, if the status constraint is entered by the client account. Thus, the remote server is prepared to set the status constraint for the unlocked status. The remote server maintains the credential set in the unlocked status, if the unlocked status in inside the status constraint. In further detail, the credential set remains in the unlocked status if a specified period of time is still ongoing, if the corresponding PC device is within a specified geofenced area, or if the subscription to a service is active. The remote server sets the credential set from the unlocked status to the locked status, if the unlocked status is outside the status constraint. In further detail, the credential set is toggled from the unlocked status to the locked status if the specified period of time has lapsed, if the corresponding PC device is outside a specified geofenced area, or if the subscription to a service is canceled or expired. Thus, the user is able to place a status constraint for the unlocked status of the credential set.

Figure 9:
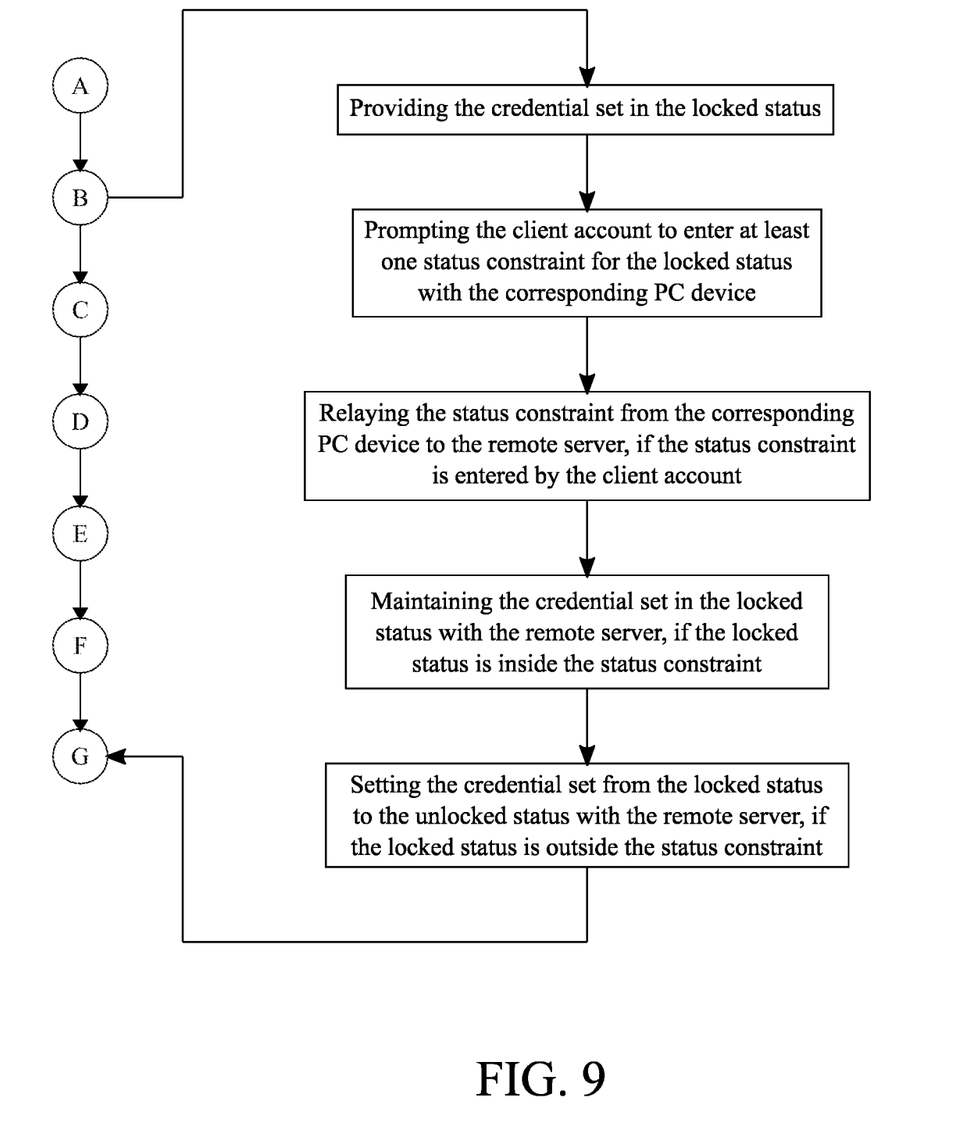
FIG. 9 is a flowchart illustrating the subprocess of applying a status constraint for the locked status of the credential set.

Alternatively and with reference to FIG. 9, the user can place a status constraint for the locked status of the credential set through the following subprocess. With the credential set already set to the locked status, the corresponding PC device prompts the client account to enter at least one status constraint for the locked status. The status constraint can be any type of constraint such as those mentioned previously. The status constraint is relayed from the corresponding PC device to the remote server, if the status constraint is entered by the client account. Thus, the remote server is prepared to set the status constraint for the locked status. The remote server maintains the credential set in the locked status, if the locked status in inside the status constraint. In further detail, the credential set remains in the locked status if a specified period of time is still ongoing, if the corresponding PC device is within a specified geofenced area, or if the subscription to a service is inactive. The remote server sets the credential set from the unlocked status to the locked status, if the unlocked status is outside the status constraint. In further detail, the credential set is toggled from the locked status to the unlocked status if the specified period of time has lapsed, if the corresponding PC device is outside a specified geofenced area, or if the subscription to a service is reactivated. Thus, user is able to place a status constraint for the locked status of the credential set.

Figure 10:
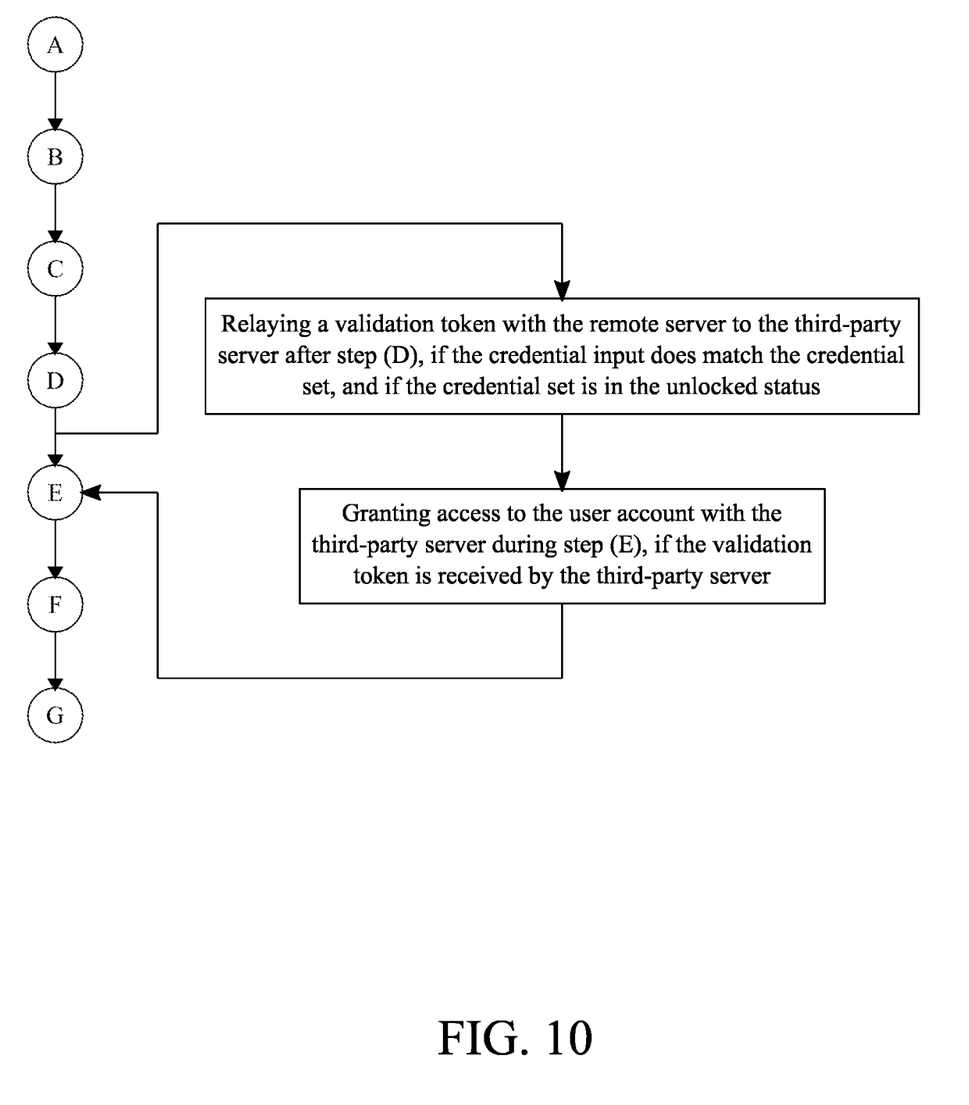
FIG. 10 is a flowchart illustrating the subprocess of the remote server validating the credential set, because the credential set is in the unlocked status, in order for the third-party server to grant access to the user account.
Figure 11:
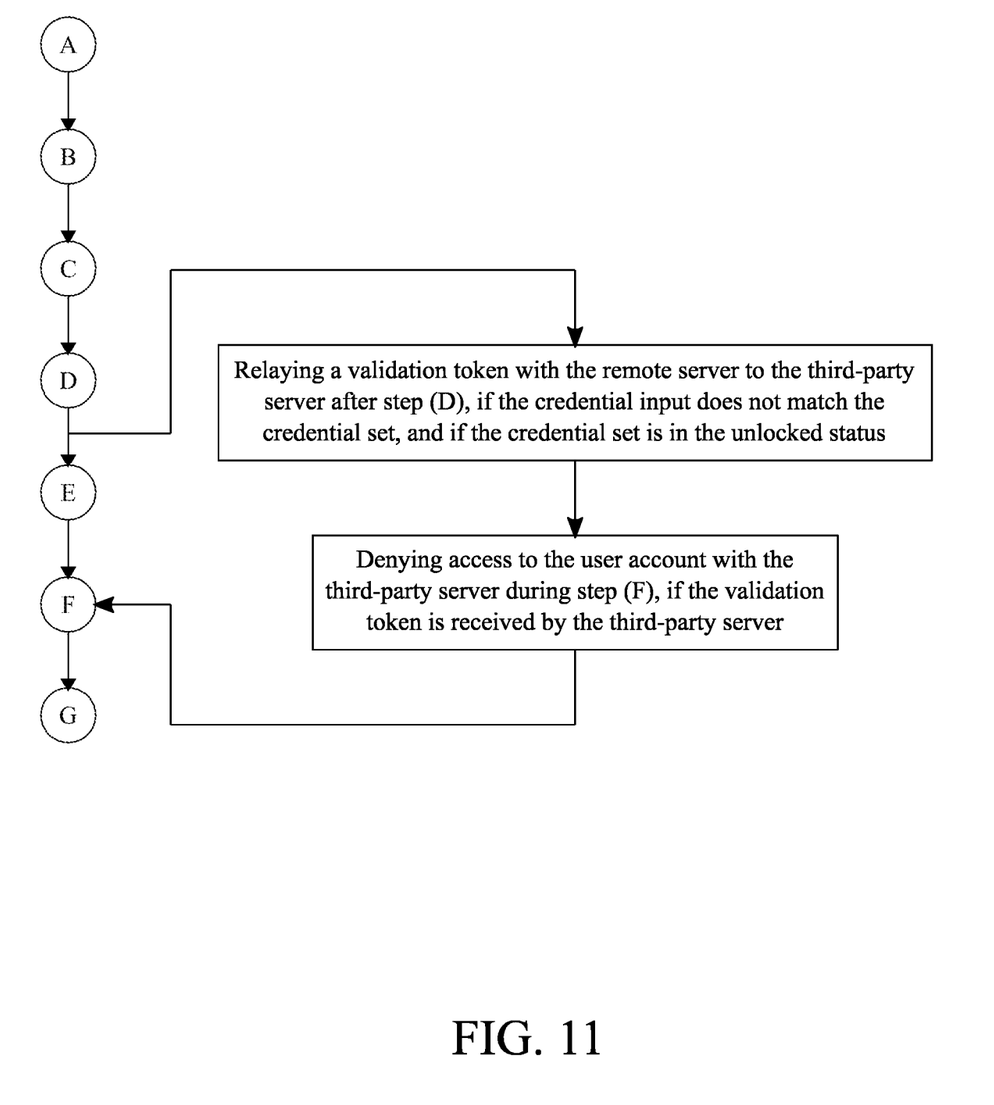
FIG. 11 is a flowchart illustrating the subprocess of the remote server validating the credential set, because the credential set is in the unlocked status, in order for the third-party server to deny access to the user account.

In order for the remote server to validate the credential set before authentication is processed by the third-party server and with reference to FIG. 10, the following subprocess is executed. Before the third-party server can authenticate the credential input provided by the client account, the third-party server requests a validation token from the remote server. The validation token is relayed with the remote server to the third-party server after Step D, if the credential input does match the credential set, and if the credential set is in the unlocked status. The third-party server can then proceed with the authentication process. The third-party sever grants access to the user account during Step E, if the validation token is received by the third-party server. In further detail, access is granted because the credential input matches the credential set, and therefore, the credential input passed the authentication process and the credential set was validated to be in the unlocked status. Alternatively and with reference to FIG. 11, the validation token is relayed with the remote server to the third-party server after Step D, if the credential input does not match the credential set, and if the credential set is in the unlocked status. The third-party server can then proceed with the authentication process. The third-party server denies access to the user account during Step F, if the validation token is received by the third-party server. In further detail, access is denied because the credential input does not match the credential set, and therefore, the credential input failed the authentication process and the credential set was validated to be in the unlocked status.

Figure 12:
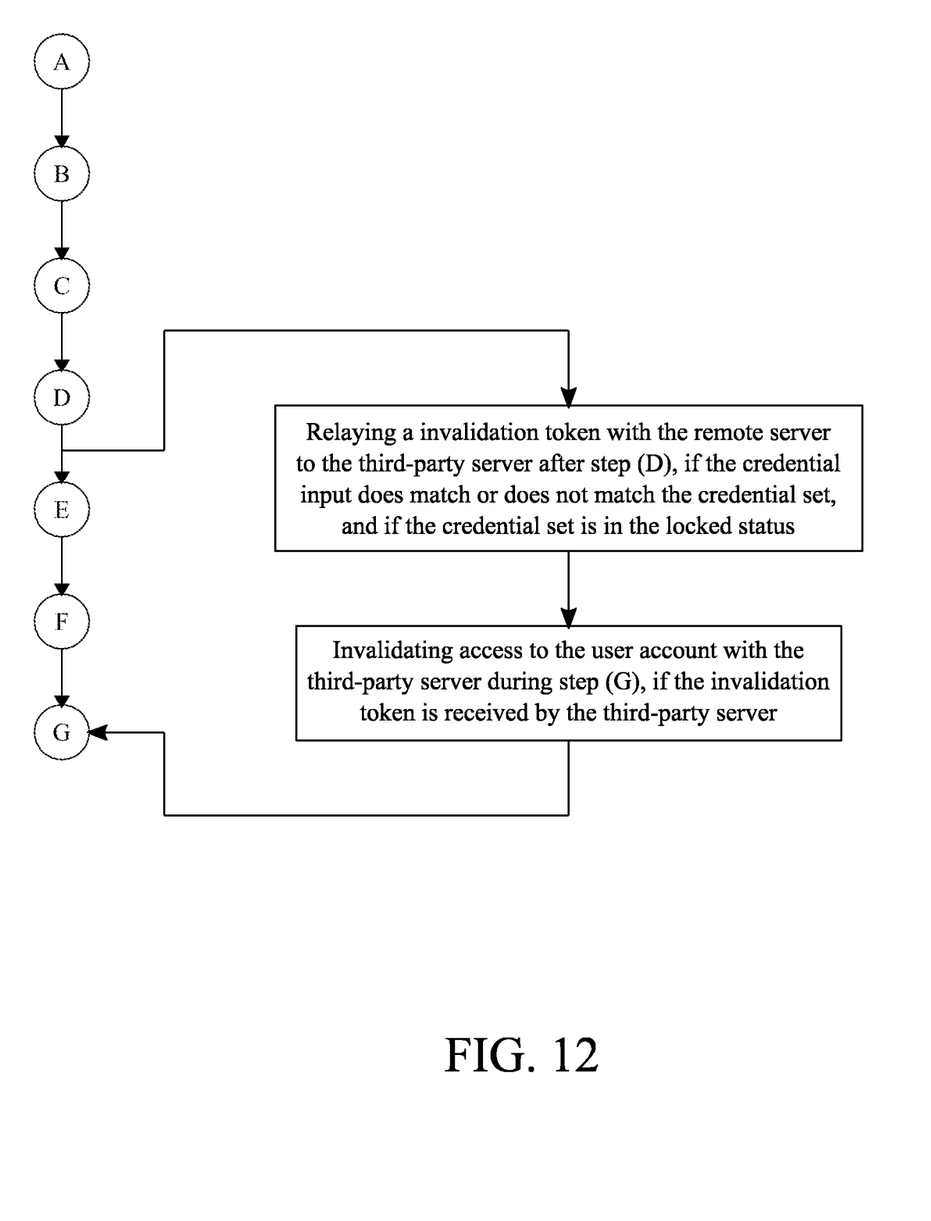
FIG. 12 is a flowchart illustrating the subprocess of the remote server invalidating the credential set, because the credential set is in the locked status, in order for the third-party server to invalidate access to the user account.
Figure 13:
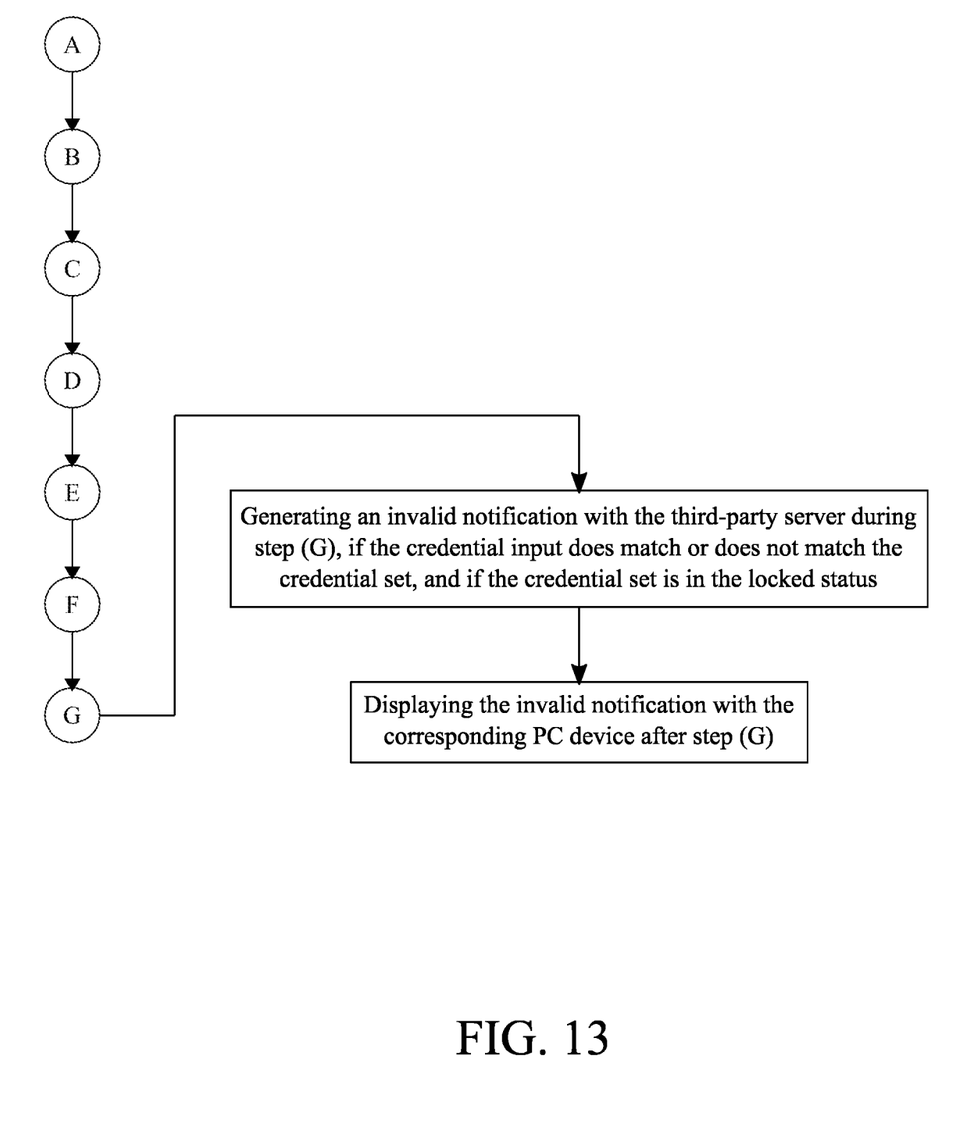
FIG. 13 is a flowchart illustrating the subprocess of displaying that the user account is invalid.

In order for the remote sever to invalidate the credential set before authentication is processed by the third-party server and with reference to FIG. 12, the following subprocess is executed. Before the third-party server can authenticate the credential input provided by the client account, the third-party server requests a token from the remote server. An invalidation token is relayed with the remote server to the third-party server after Step D, if the credential input does match or does not match the credential set, and if the credential set is in the locked status. The third-party server does not proceed with authentication process. The third-party sever invalidates access to the user account during Step G, if the invalidation token is received by the third-party server. In further detail, the user account is prevented from being accessed altogether because the credential set is in the locked status. Moreover and with reference to FIG. 13, the third-party server generates an invalid notification during Step G, if the credential input does match or does not match the credential set, and if the credential set is in the locked status. The invalid notification can be any type of notification such as, but not limited, an error message or an error website page which prevents access to the user account. The invalid notification is then displayed with the corresponding PC device after Step G. In further detail, the invalid notification can be displayed as a pop-up error message after the user is prevented access to the user account or the user is directed to an error website page.

Although the invention has been explained in relation to its preferred embodiment, it is to be understood that many other possible modifications and variations can be made without departing from the spirit and scope of the invention as hereinafter claimed.

What is claimed is:

1. A method for facilitating the security for sets of credentials, the method comprising the steps of:
 (A) providing at least one client account managed by at least one remote server, wherein the client account is associated with a corresponding personal computing (PC) device;
 (B) providing at least one user account managed by at least one third-party server, wherein the user account is associated with the corresponding PC device, and wherein the user account includes a credential set, and wherein the user account and the client account are two functionally-separate accounts but are associated to each other, and wherein the user account is used to access and interface with at least one third-party service hosted on the third-party server, and wherein the credential set is either in an unlocked status or a locked status, and wherein the client account is able to toggle the credential set for the user account between the unlocked status and the locked status;
 (C) prompting the client account to enter a credential input for the user account with the corresponding PC device;
 (D) relaying the credential input from the corresponding PC device, through the third-party server, and to the remote server, if the credential input is entered by the client account;
 (E) granting access to the user account with the third-party server, if the credential input does match the credential set, and if the credential set is in the unlocked status;
 (F) denying access to the user account with the third-party server, if the credential input does not match the credential set, and if the credential set is in the unlocked status;
 (G) invalidating access to the user account with the third-party server, if the credential input does match or does not match the credential set, and if the credential set is in the locked status; and
 sequentially executing steps (C) through (G).

2. The method for facilitating the security for sets of credentials, the method as claimed in claim 1 comprising the steps of:
 prompting the client account to link to the user account with the corresponding PC device during step (B); and
 generating an association between the user account and the client account with the remote server, if the user account is selected to be linked to the client account.

3. The method for facilitating the security for sets of credentials, the method as claimed in claim 1 comprising the steps of:
 prompting the client account to enter a single status selection for the credential set with the corresponding PC device;
 relaying the single status selection from the corresponding PC device to the remote server, if the single status selection is entered by the client account;
 setting the credential set to the unlocked status with the remote server, if the single status selection is for the unlocked status; and
 setting the credential set to the locked status with the remote server, if the single status selection is for the locked status.

4. The method for facilitating the security for sets of credentials, the method as claimed in claim 1 comprising the steps of:
 providing at least one user account as a plurality of user accounts;

prompting the client account to enter a group status selection for the credential set of each user account with the corresponding PC device;
relaying the group status selection from the corresponding PC device to the remote server, if the group status selection is entered by the client account;
setting the credential set of each user account to the unlocked status with the remote server, if the group status selection is for the unlocked status; and
setting the credential set of each user account to the locked status with the remote server, if the group status selection is for the locked status.

5. The method for facilitating the security for sets of credentials, the method as claimed in claim 1 comprising the steps of:
providing at least one administrator account managed by the third-party server, wherein the administrator account includes a status selection ability;
prompting the administrator account to enter a single status selection for the credential set with the third-party server;
relaying the single status selection from the third-party server to the remote server, if the single status selection is entered by the administrator account;
setting the credential set to the unlocked status with the remote server, if the single status selection is for the unlocked status; and
setting the credential set to the locked status with the remote server, if the single status selection is for the locked status.

6. The method for facilitating the security for sets of credentials, the method as claimed in claim 5 comprising the steps of:
prompting the client account to grant the status selection ability to the administrator account with the corresponding PC device; and
relaying a client token from the remote server to the third-party server, if the status selection ability for the administrator account is granted by the client account.

7. The method for facilitating the security for sets of credentials, the method as claimed in claim 1 comprising the steps of:
providing the credential set in the unlocked status;
prompting the client account to enter at least one status constraint for the unlocked status with the corresponding PC device;
relaying the status constraint from the corresponding PC device to the remote server, if the status constraint is entered by the client account;
maintaining the credential set in the unlocked status with the remote server, if the unlocked status is inside the status constraint; and
setting the credential set from the unlocked status to the locked status with the remote server, if the unlocked status is outside the status constraint.

8. The method for facilitating the security for sets of credentials, the method as claimed in claim 1 comprising the steps of:
providing the credential set in the locked status;
prompting the client account to enter at least one status constraint for the locked status with the corresponding PC device;
relaying the status constraint from the corresponding PC device to the remote server, if the status constraint is entered by the client account;
maintaining the credential set in the locked status with the remote server, if the locked status is inside the status constraint; and
setting the credential set from the locked status to the unlocked status with the remote server, if the locked status is outside the status constraint.

9. The method for facilitating the security for sets of credentials, the method as claimed in claim 1 comprising the steps of:
relaying a validation token with the remote server to the third-party server after step (D), if the credential input does match the credential set, and if the credential set is in the unlocked status; and
granting access to the user account with the third-party server during step (E), if the validation token is received by the third-party server.

10. The method for facilitating the security for sets of credentials, the method as claimed in claim 1 comprising the steps of:
relaying a validation token with the remote server to the third-party server after step (D), if the credential input does not match the credential set, and if the credential set is in the unlocked status; and
denying access to the user account with the third-party server during step (F), if the validation token is received by the third-party server.

11. The method for facilitating the security for sets of credentials, the method as claimed in claim 1 comprising the steps of:
relaying an invalidation token with the remote server to the third-party server after step (D), if the credential input does match or does not match the credential set, and if the credential set is in the locked status; and
invalidating access to the user account with the third-party server during step (G), if the invalidation token is received by the third-party server.

12. The method for facilitating the security for sets of credentials, the method as claimed in claim 1 comprising the steps of:
generating an invalid notification with the third-party server during step (G), if the credential input does match or does not match the credential set, and if the credential set is in the locked status; and
displaying the invalid notification with the corresponding PC device after step (G).

* * * * *